(12) United States Patent
Matsuo et al.

(10) Patent No.: US 11,802,171 B2
(45) Date of Patent: Oct. 31, 2023

(54) BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, NEGATIVE ELECTRODE FOR NON-AQUEOUS SECONDARY BATTERY, NON-AQUEOUS SECONDARY BATTERY, AND METHOD OF PRODUCING ELECTRODE FOR NON-AQUEOUS SECONDARY BATTERY

(71) Applicant: ZEON CORPORATION, Tokyo (JP)

(72) Inventors: Yusaku Matsuo, Tokyo (JP); Norikazu Yamamoto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 471 days.

(21) Appl. No.: 16/487,576

(22) PCT Filed: Feb. 26, 2018

(86) PCT No.: PCT/JP2018/007008
§ 371 (c)(1),
(2) Date: Aug. 21, 2019

(87) PCT Pub. No.: WO2018/168420
PCT Pub. Date: Sep. 20, 2018

(65) Prior Publication Data
US 2019/0379050 A1   Dec. 12, 2019

(30) Foreign Application Priority Data
Mar. 13, 2017   (JP) .................. 2017-047715

(51) Int. Cl.
| | |
|---|---|
| *H01M 4/00* | (2006.01) |
| *C08F 212/08* | (2006.01) |
| *C08L 9/06* | (2006.01) |
| *C08L 25/06* | (2006.01) |
| *H01M 4/62* | (2006.01) |
| *H01M 10/0525* | (2010.01) |
| *H01M 4/1391* | (2010.01) |
| *H01M 4/02* | (2006.01) |

(52) U.S. Cl.
CPC ............. *C08F 212/08* (2013.01); *C08L 9/06* (2013.01); *C08L 25/06* (2013.01); *H01M 4/622* (2013.01); *H01M 10/0525* (2013.01); *C08L 2203/20* (2013.01); *H01M 4/1391* (2013.01); *H01M 2004/027* (2013.01)

(58) Field of Classification Search
CPC .. C08F 212/08; C08F 236/06; C08F 297/044; C08L 9/06; C08L 25/06; C08L 2203/20; C08L 53/025; C08L 53/02; C08L 53/00; H01M 4/622; H01M 10/0525; H01M 4/1391; H01M 2004/027; H01M 4/0404; H01M 2004/021; H01M 4/043; H01M 4/139; H01M 4/0471; H01M 4/13; H01M 10/052; H01M 2300/002; Y02E 60/10

See application file for complete search history.

(56) References Cited

U.S. PATENT DOCUMENTS

| | | | |
|---|---|---|---|
| 5,536,772 A * | 7/1996 | Dillman .................. | C08L 15/00 524/483 |
| 6,287,723 B1 * | 9/2001 | Maeda .................. | H01M 4/621 429/216 |
| 11,152,667 B2 | 10/2021 | Sasaki et al. | |
| 2013/0330622 A1 | 12/2013 | Sasaki | |
| 2015/0311490 A1 * | 10/2015 | Murase ............... | H01M 10/052 429/131 |
| 2016/0036055 A1 | 2/2016 | Yamamoto | |
| 2018/0358625 A1 * | 12/2018 | Oguro ..................... | H01M 4/13 |
| 2019/0044147 A1 | 2/2019 | Yamamoto | |
| 2021/0111408 A1 * | 4/2021 | Matsuo ................. | C08L 33/064 |

FOREIGN PATENT DOCUMENTS

| | | |
|---|---|---|
| CN | 105190967 A | 12/2015 |
| EP | 3358659 A1 | 8/2018 |
| JP | 2011108373 A | 6/2011 |
| JP | 2012182012 A | 9/2012 |

(Continued)

OTHER PUBLICATIONS

Sep. 17, 2019, International Preliminary Report on Patentability issued in the International Patent Application No. PCT/JP2018/007008.

(Continued)

*Primary Examiner* — Nicholas P D'Aniello

(74) *Attorney, Agent, or Firm* — KENJA IP LAW PC

(57) ABSTRACT

Provided is a binder composition for a non-aqueous secondary battery electrode that can ensure excellent stability of a slurry composition for a non-aqueous secondary battery electrode while also inhibiting swelling of an electrode for a non-aqueous secondary battery associated with repeated charging and discharging and causing a non-aqueous secondary battery to display excellent cycle characteristics. The binder composition contains a particulate polymer A and a particulate polymer B. The particulate polymer A is a copolymer having a block region composed of an aromatic vinyl monomer unit. The particulate polymer B is a random copolymer including an aliphatic conjugated diene monomer unit and an aromatic vinyl monomer unit.

13 Claims, No Drawings

(56) References Cited

FOREIGN PATENT DOCUMENTS

| JP | 2017010822 A | 1/2017 |
|---|---|---|
| JP | 6828686 B2 | 2/2021 |
| KR | 1020160078967 A | 7/2016 |
| WO | 2012115096 A1 | 8/2012 |
| WO | 2017056404 A1 | 4/2017 |

OTHER PUBLICATIONS

Nov. 17, 2021, Communication pursuant to Article 94(3) EPC issued by the European Patent Office in the corresponding European Patent Application No. 18768618.3.

Apr. 17, 2018, International Search Report issued in the International Patent Application No. PCT/JP2018/007008.

Feb. 5, 2021, the Extended European Search Report issued by the European Patent Office in the corresponding European Patent Application No. 18768618.3.

* cited by examiner

BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, NEGATIVE ELECTRODE FOR NON-AQUEOUS SECONDARY BATTERY, NON-AQUEOUS SECONDARY BATTERY, AND METHOD OF PRODUCING ELECTRODE FOR NON-AQUEOUS SECONDARY BATTERY

TECHNICAL FIELD

The present disclosure relates to a binder composition for a non-aqueous secondary battery electrode, a slurry composition for a non-aqueous secondary battery electrode, an electrode for a non-aqueous secondary battery, a negative electrode for a non-aqueous secondary battery, a non-aqueous secondary battery, and a method of producing an electrode for a non-aqueous secondary battery.

BACKGROUND

Non-aqueous secondary batteries (hereinafter, also referred to simply as "secondary batteries"), such as lithium ion secondary batteries, have characteristics such as compact size, light weight, high energy density, and the ability to be repeatedly charged and discharged, and are used in a wide variety of applications. Therefore, studies have been carried out in recent years with the objective of further raising the performance of secondary batteries through improvement of electrodes and other battery components.

An electrode used in a secondary battery, such as a lithium ion secondary battery, generally includes a current collector and an electrode mixed material layer formed on the current collector. This electrode mixed material layer is formed by, for example, applying a slurry composition containing an electrode active material, a binder-containing binder composition, and so forth onto the current collector, and then drying the applied slurry composition.

In order to further improve the performance of secondary batteries, attempts have been made in recent years to improve binder compositions used in electrode mixed material layer formation. For example, it has been proposed that the performance of a secondary battery can be improved by using a binder composition that contains two types of particulate polymers as a binder.

More specifically, Patent Literature (PTL) 1, for example, proposes a technique for increasing binding capacity amongst an electrode active material or between an electrode active material and a current collector while also improving cycle characteristics of a secondary battery by using, as a binder, first rubbery resin particles composed of styrene-butadiene rubber particles having an average particle diameter of 130 nm or more and second rubbery resin particles composed of nitrile rubber particles having an average particle diameter of less than 130 nm.

CITATION LIST

Patent Literature

PTL 1: JP 2012-182012 A

SUMMARY

Technical Problem

However, when a binder composition containing the conventional binder described above has been used to prepare a slurry composition, excessive thickening of the slurry composition has occurred and it has not been possible to ensure sufficient stability of the slurry composition. Moreover, when the conventional binder composition described above is used to prepare an electrode, there is a problem that swelling of the electrode associated with repeated charging and discharging cannot be inhibited. Furthermore, it has not been possible to cause a secondary battery to display excellent cycle characteristics using an electrode obtained with such a conventional binder composition.

Therefore, there is still room for improvement of the conventional binder composition described above in terms of ensuring slurry composition stability while also inhibiting electrode swelling associated with repeated charging and discharging and causing a secondary battery to display excellent cycle characteristics.

Accordingly, an objective of the present disclosure is to provide a binder composition for a non-aqueous secondary battery electrode that can ensure excellent stability of a slurry composition for a non-aqueous secondary battery electrode while also inhibiting swelling of an electrode for a non-aqueous secondary battery associated with repeated charging and discharging and causing a non-aqueous secondary battery to display excellent cycle characteristics.

Another objective of the present disclosure is to provide a slurry composition for a non-aqueous secondary battery electrode that has excellent stability and that can also inhibit swelling of an electrode for a non-aqueous secondary battery associated with repeated charging and discharging and cause a non-aqueous secondary battery to display excellent cycle characteristics.

Another objective of the present disclosure is to provide an electrode for a non-aqueous secondary battery that has a low tendency to swell in association with repeated charging and discharging and that can cause a non-aqueous secondary battery to display excellent cycle characteristics, and to provide a method of producing this electrode.

Another objective of the present disclosure is to provide a non-aqueous secondary battery having excellent cycle characteristics.

Solution to Problem

The inventors conducted diligent investigation with the aim of solving the problems set forth above. Through this investigation, the inventors discovered that it is possible to ensure slurry composition stability while also inhibiting electrode swelling associated with repeated charging and discharging and improving secondary battery cycle characteristics by using a binder composition that contains two types of particulate polymers, and, more specifically, that contains both a particulate polymer formed by a copolymer having a block region composed only of aromatic vinyl monomer units and a particulate polymer formed by a random copolymer including an aliphatic conjugated diene monomer unit and an aromatic vinyl monomer unit. In this manner, the inventors completed the present disclosure.

Specifically, the present disclosure aims to advantageously solve the problems set forth above by disclosing a binder composition for a non-aqueous secondary battery electrode comprising: a particulate polymer A and a particulate polymer B, wherein the particulate polymer A is a copolymer having a block region composed of an aromatic vinyl monomer unit, and the particulate polymer B is a random copolymer including an aliphatic conjugated diene monomer unit and an aromatic vinyl monomer unit. A binder composition that contains a particulate polymer A that is a copolymer having a block region composed of an aromatic vinyl monomer unit and a particulate polymer B that is a random copolymer including an aliphatic conjugated diene monomer unit and an aromatic vinyl monomer unit as set forth above can be used to produce a slurry composition having excellent stability. Moreover, a slurry composition containing this binder composition can be used to produce an electrode that has a low tendency to swell in association with repeated charging and discharging and that can cause a secondary battery to display excellent cycle characteristics.

The phrase "includes a monomer unit" as used in relation to a polymer in the present disclosure means that "a polymer obtained with the monomer includes a repeating unit derived from the monomer".

Moreover, the phrase "having a block region composed of an aromatic vinyl monomer unit" as used in relation to a polymer in the present disclosure means that in the polymer, "a molecular chain section where only aromatic vinyl monomer units are linked is present".

In the presently disclosed binder composition for a non-aqueous secondary battery electrode, content of the particulate polymer A is preferably not less than 20 mass % and not more than 80 mass % of total content of the particulate polymer A and the particulate polymer B. When the proportion constituted by content of the particulate polymer A among total content of the particulate polymers A and B is within the range set forth above, slurry composition stability can be further increased while also further inhibiting electrode swelling associated with repeated charging and discharging and further improving secondary battery cycle characteristics.

In the presently disclosed binder composition for a non-aqueous secondary battery electrode, the particulate polymer A preferably includes the aromatic vinyl monomer unit in a proportion of not less than 10 mass % and not more than 70 mass %. By using a particulate polymer A that includes an aromatic vinyl monomer unit in a proportion that is within the range set forth above, electrode swelling associated with repeated charging and discharging can be further inhibited while also further improving secondary battery cycle characteristics.

In the presently disclosed binder composition for a non-aqueous secondary battery electrode, it is preferable that the particulate polymer A further includes either or both of an aliphatic conjugated diene monomer unit and an alkylene structural unit, and the aliphatic conjugated diene monomer unit and the alkylene structural unit constitute a total proportion of not less than 30 mass % and not more than 90 mass % in the particulate polymer A. By using a particulate polymer A that includes an aliphatic conjugated diene monomer unit and/or an alkylene structural unit in a proportion that is within the range set forth above, electrode swelling associated with repeated charging and discharging can be further inhibited while also further improving secondary battery cycle characteristics.

In the presently disclosed binder composition for a non-aqueous secondary battery electrode, the particulate polymer B preferably includes the aliphatic conjugated diene monomer unit in a proportion of not less than 20 mass % and not more than 60 mass %. By using a particulate polymer B that includes an aliphatic conjugated diene monomer unit in a proportion that is within the range set forth above, slurry composition stability can be sufficiently increased while also further inhibiting electrode swelling associated with repeated charging and discharging and further improving secondary battery cycle characteristics.

In the presently disclosed binder composition for a non-aqueous secondary battery electrode, the particulate polymer B preferably includes the aromatic vinyl monomer unit in a proportion of not less than 10 mass % and not more than 70 mass %. By using a particulate polymer B including an aromatic vinyl monomer unit in a proportion that is within the range set forth above, slurry composition stability can be sufficiently increased while also further inhibiting electrode swelling associated with repeated charging and discharging and further improving secondary battery cycle characteristics.

In the presently disclosed binder composition for a non-aqueous secondary battery electrode, the particulate polymer A preferably has a larger volume-average particle diameter than the particulate polymer B. When the volume-average particle diameter of the particulate polymer A is larger than the volume-average particle diameter of the particulate polymer B, electrode swelling associated with repeated charging and discharging can be further inhibited while also further improving secondary battery cycle characteristics.

The "volume-average particle diameter" of a particulate polymer referred to in the present disclosure can be measured by a method described in the EXAMPLES section of the present specification.

Moreover, the present disclosure aims to advantageously solve the problems set forth above by disclosing a slurry composition for a non-aqueous secondary battery electrode comprising: an electrode active material; and any one of the binder compositions for a non-aqueous secondary battery electrode set forth above. A slurry composition that contains an electrode active material and any one of the binder compositions set forth above in this manner has excellent stability. Moreover, the slurry composition containing this binder composition can be used to produce an electrode that has a low tendency to swell in association with repeated charging and discharging and that can cause a secondary battery to display excellent cycle characteristics.

Furthermore, the present disclosure aims to advantageously solve the problems set forth above by disclosing an electrode for a non-aqueous secondary battery comprising an electrode mixed material layer formed using the slurry composition for a non-aqueous secondary battery electrode set forth above. An electrode including an electrode mixed material layer obtained using the slurry composition set forth above in this manner has a low tendency to swell in association with repeated charging and discharging and can cause a secondary battery to display excellent cycle characteristics.

Also, the present disclosure aims to advantageously solve the problems set forth above by disclosing a negative electrode for a non-aqueous secondary battery comprising a negative electrode mixed material layer formed using the slurry composition for a non-aqueous secondary battery electrode, wherein the negative electrode mixed material layer has a density of 1.7 $g/cm^3$ or more. A negative electrode including a negative electrode mixed material layer that is obtained using the slurry composition set forth above and that has a density of 1.7 $g/cm^3$ or more in this manner has a low tendency to swell in association with repeated charging and discharging and can sufficiently increase energy density of a secondary battery and cause the secondary battery to display excellent cycle characteristics.

The "density" of an electrode mixed material layer referred to in the present disclosure can be calculated from the mass per unit area of the electrode mixed material layer and the thickness of the electrode mixed material layer.

Moreover, the present disclosure aims to advantageously solve the problems set forth above by disclosing a non-aqueous secondary battery comprising the electrode for a non-aqueous secondary battery set forth above or the negative electrode for a non-aqueous secondary battery set forth above. A non-aqueous secondary battery that includes either of the electrodes set forth above in this manner has excellent cycle characteristics.

Furthermore, the present disclosure aims to advantageously solve the problems set forth above by disclosing a method of producing an electrode for a non-aqueous secondary battery comprising: applying the slurry composition for a non-aqueous secondary battery electrode set forth above onto a current collector; drying the slurry composition for a non-aqueous secondary battery electrode that has been applied onto the current collector to form a pre-pressing electrode mixed material layer on the current collector; and pressing the pre-pressing electrode mixed material layer to obtain a post-pressing electrode mixed material layer, wherein the pressing of the pre-pressing electrode mixed material layer is performed at a temperature of not lower than 50° C. and not higher than 150° C. Adoption of the procedure set forth above using the slurry composition set forth above enables good production of an electrode that has high density and low tendency to swell in association with repeated charging and discharging. Moreover, this electrode can be used to cause a secondary battery to display excellent cycle characteristics.

Advantageous Effect

According to the present disclosure, it is possible to provide a binder composition for a non-aqueous secondary battery electrode that can ensure excellent stability of a slurry composition for a non-aqueous secondary battery electrode while also inhibiting swelling of an electrode for a non-aqueous secondary battery associated with repeated charging and discharging and causing a non-aqueous secondary battery to display excellent cycle characteristics.

Moreover, according to the present disclosure, it is possible to provide a slurry composition for a non-aqueous secondary battery electrode that has excellent stability and that can also inhibit swelling of an electrode for a non-aqueous secondary battery associated with repeated charging and discharging and cause a non-aqueous secondary battery to display excellent cycle characteristics.

Furthermore, according to the present disclosure, it is possible to provide an electrode for a non-aqueous secondary battery that has a low tendency to swell in association with repeated charging and discharging and that can cause a non-aqueous secondary battery to display excellent cycle characteristics, and a method of producing this electrode.

Also, according to the present disclosure, it is possible to provide a non-aqueous secondary battery having excellent cycle characteristics.

DETAILED DESCRIPTION

The following provides a detailed description of embodiments of the present disclosure.

The presently disclosed binder composition for a non-aqueous secondary battery electrode can be used in production of the presently disclosed slurry composition for a non-aqueous secondary battery electrode. Moreover, the presently disclosed slurry composition for a non-aqueous secondary battery electrode produced using the presently disclosed binder composition for a non-aqueous secondary battery electrode can be used, for example, in formation of the presently disclosed electrode for a non-aqueous secondary battery by the presently disclosed method of producing an electrode for a non-aqueous secondary battery. Furthermore, a feature of the presently disclosed non-aqueous secondary battery is that the presently disclosed electrode for a non-aqueous secondary battery formed using the presently disclosed slurry composition for a non-aqueous secondary battery electrode is used therein.

Note that the presently disclosed binder composition for a non-aqueous secondary battery electrode and slurry composition for a non-aqueous secondary battery electrode are particularly suitable for use in formation of a negative electrode of a non-aqueous secondary battery.

(Binder Composition for Non-Aqueous Secondary Battery Electrode)

The presently disclosed binder composition contains a particulate polymer A and a particulate polymer B, and may optionally further contain other components that can be compounded in secondary battery electrodes. Moreover, the presently disclosed binder composition for a non-aqueous secondary battery electrode may further contain a dispersion medium such as water. In the presently disclosed binder composition, the particulate polymer A is a copolymer having a block region composed of an aromatic vinyl monomer unit and the particulate polymer B is a random copolymer including an aliphatic conjugated diene monomer unit and an aromatic vinyl monomer unit.

As a result of the presently disclosed binder composition containing two binders (i.e., containing both the particulate polymer A that has a block region composed of an aromatic vinyl monomer unit and that can favorably follow expansion and contraction of an electrode active material associated with repeated charging and discharging and the particulate polymer B that has a random structure including an aliphatic conjugated diene monomer unit and an aromatic vinyl monomer unit and that can improve slurry composition stability), the contributions of these two binders combine to increase slurry composition stability while also inhibiting electrode swelling associated with repeated charging and discharging and improving secondary battery cycle characteristics.

<Particulate Polymer A>

In an electrode produced by forming an electrode mixed material layer on a current collector using a slurry composition for a non-aqueous secondary battery electrode produced using the binder composition, the particulate polymer A holds components contained in the electrode mixed material layer to prevent these components detaching from the electrode mixed material layer (i.e., functions as a binder).

<<Structure and Chemical Composition>>

The particulate polymer A is a copolymer having a block region composed of an aromatic vinyl monomer unit (hereinafter, also referred to simply as an "aromatic vinyl block region") and a molecular chain section in which repeating units other than aromatic vinyl monomer units are linked (hereinafter, also referred to simply as the "other region"). The aromatic vinyl block region and the other region are adjacent in the copolymer. The copolymer may include one aromatic vinyl block region or a plurality of aromatic vinyl block regions, and, likewise, may include one other region or a plurality of other regions.

The particulate polymer A including the aromatic vinyl block region and the other region has both stiffness and flexibility, which enables the particulate polymer A to favorably follow expansion and contraction of an electrode active material associated with repeated charging and discharging of a secondary battery.

[Aromatic Vinyl Block Region]

The aromatic vinyl block region is a region that is composed of only aromatic vinyl monomer units as previously described.

A single aromatic vinyl block region may be composed of one type of aromatic vinyl monomer unit or may be composed of more than one type of aromatic vinyl monomer unit, but is preferably composed of one type of aromatic vinyl monomer unit.

Moreover, in a case in which the copolymer includes a plurality of aromatic vinyl block regions, the types and proportions of aromatic vinyl monomer units composing these aromatic vinyl block regions may be the same or different for each of the regions, but are preferably the same for each of the aromatic vinyl block regions.

Examples of aromatic vinyl monomers that can form a constituent aromatic vinyl monomer unit of the aromatic vinyl block region in the particulate polymer A include styrene, styrenesulfonic acid and salts thereof, α-methylstyrene, p-t-butylstyrene, butoxystyrene, vinyltoluene, chlorostyrene, and vinylnaphthalene. Of these aromatic vinyl monomers, styrene is preferable. Although one of these aromatic vinyl monomers may be used individually or two or more of these aromatic vinyl monomers may be used in combination, it is preferable that one aromatic vinyl monomer is used individually.

The proportion constituted by an aromatic vinyl monomer unit in the particulate polymer A when the amount of all repeating units (monomer units and structural units) in the particulate polymer A is taken to be 100 mass % is preferably 10 mass % or more, and more preferably 14 mass % or more, and is preferably 70 mass % or less, more preferably 50 mass % or less, even more preferably 45 mass % or less, and particularly preferably 40 mass % or less. When the proportion constituted by the aromatic vinyl monomer unit in the particulate polymer A is 10 mass % or more, sufficient stiffness of the particulate polymer A can be ensured and electrode swelling associated with repeated charging and discharging can be further inhibited while also further improving secondary battery cycle characteristics. On the other hand, when the proportion constituted by the aromatic vinyl monomer unit in the particulate polymer A is 70 mass % or less, sufficient flexibility of the particulate polymer A can be ensured and secondary battery cycle characteristics can be further improved.

Note that the proportion constituted by the aromatic vinyl monomer unit in the particulate polymer A normally matches the proportion constituted by the aromatic vinyl block region in the particulate polymer A.

[Other Region]

As previously described, the other region is a region that is composed of repeating units other than the aromatic vinyl monomer unit described above (hereinafter, also referred to simply as "other repeating units").

Note that a single other region may be composed of one other type of repeating unit or may be composed of more than one other type of repeating unit.

Moreover, in a case in which the copolymer (particulate polymer A) has a plurality of other regions, the types and proportions of other repeating units composing these other regions may be the same or different for each of the regions.

Although no specific limitations are placed on other repeating units that may compose the other region of the particulate polymer A, an aliphatic conjugated diene monomer unit and an alkylene structural unit are preferable, for example.

Examples of aliphatic conjugated diene monomers that can form a constituent aliphatic conjugated diene monomer unit of the other region in the particulate polymer A include conjugated diene compounds having a carbon number of 4 or more such as 1,3-butadiene, isoprene, 2,3-dimethyl-1,3-butadiene, and 1,3-pentadiene. Of these aliphatic conjugated diene monomers, 1,3-butadiene is preferable. One of these aliphatic conjugated diene monomers may be used individually, or two or more of these aliphatic conjugated diene monomers may be used in combination.

A constituent alkylene structural unit of the other region is a repeating unit composed only of an alkylene structure represented by a general formula: —$C_nH_{2n}$— (n is an integer of 2 or more).

Although the alkylene structural unit may be linear or branched, the alkylene structural unit is preferably linear (i.e., is preferably a linear alkylene structural unit). Moreover, the carbon number of the alkylene structural unit is preferably 4 or more (i.e., n in the preceding general formula is preferably an integer of 4 or more).

No specific limitations are placed on the method by which the alkylene structural unit is introduced into the particulate polymer A. For example, a method in which a copolymer is prepared from a monomer composition containing an aliphatic conjugated diene monomer and then the copolymer is hydrogenated to convert an aliphatic conjugated diene monomer unit to an alkylene structural unit and thereby obtain the particulate polymer A is preferable due to ease of production of the particulate polymer A.

The aliphatic conjugated diene monomer used in this method may, for example, be any of the previously described conjugated diene compounds having a carbon number of 4 or more that can be used as an aliphatic conjugated diene monomer for forming the aliphatic conjugated diene monomer unit, of which, 1,3-butadiene is preferable. In other words, the alkylene structural unit is preferably a structural unit that is obtained through hydrogenation of an aliphatic conjugated diene monomer unit (i.e., a hydrogenated aliphatic conjugated diene monomer unit), and is more preferably a structural unit that is obtained through hydrogenation of a 1,3-butadiene unit (i.e., a hydrogenated 1,3-butadiene unit). Selective hydrogenation of the aliphatic conjugated diene monomer unit can be carried out by a commonly known method such as an oil-layer hydrogenation method or a water-layer hydrogenation method.

The total proportion constituted by the aliphatic conjugated diene monomer unit and the alkylene structural unit in the particulate polymer A when the amount of all repeating units in the particulate polymer A is taken to be 100 mass % is preferably 30 mass % or more, more preferably 50 mass % or more, even more preferably 55 mass % or more, and particularly preferably 60 mass % or more, and is preferably 90 mass % or less, and more preferably 86 mass % or less. When the total proportion constituted by the aliphatic conjugated diene monomer unit and the alkylene structural unit in the particulate polymer A is 30 mass % or more, the particulate polymer A can more favorably follow expansion and contraction of an electrode active material. Consequently, electrode swelling associated with repeated charging and discharging can be further inhibited and secondary battery cycle characteristics can be further improved. On the other hand, when the total proportion constituted by the aliphatic conjugated diene monomer unit and the alkylene structural unit in the particulate polymer A is 90 mass % or less, secondary battery cycle characteristics can be further improved.

[Diblock Content]

The copolymer forming the particulate polymer A may have any structure, such as a diblock structure including one each of two types of block regions (for example, a structure including an aromatic vinyl block region composed of styrene units and another region composed of 1,3-butadiene units) or a triblock structure including three block regions (for example, a structure including an aromatic vinyl block region composed of styrene units, another region composed of 1,3-butadiene units, and an aromatic vinyl block region composed of styrene units).

The proportion constituted by copolymer having a diblock structure (diblock content) in the whole particulate polymer A when the mass of the particulate polymer A is taken to be 100 mass % is preferably 5 mass % or more, and more preferably 10 mass % or more, and is preferably 90 mass % or less, and more preferably 85 mass % or less. When the diblock content of the particulate polymer A is 5 mass % or more, an electrode mixed material layer formed using the binder composition adheres strongly to a current collector. This can further inhibit electrode swelling associated with repeated charging and discharging and further improve secondary battery cycle characteristics. On the other hand, when the diblock content of the particulate polymer A is 90 mass % or less, secondary battery cycle characteristics can be further improved through an appropriate degree of aggregation of the particulate polymer A in an electrode mixed material layer.

The diblock content can be measured from the area ratio of peaks corresponding to each block copolymer that are obtained using a high-performance liquid chromatograph (values in terms of standard polystyrene).

The diblock content can be adjusted by altering the type of coupling agent used in production of the particulate polymer A.

<<Production Method>>

No specific limitations are placed on the method by which the particulate polymer A having a block region composed of an aromatic vinyl monomer unit is produced. For example, the particulate polymer A may be produced by polymerizing a first monomer component, subsequently adding a second monomer component, differing from the first monomer component, to the resultant solution and polymerizing the second monomer component, and then further repeating monomer component addition and polymerization as necessary. An organic solvent that is used as a reaction solvent is not specifically limited and may be selected as appropriate depending on the types of monomers and so forth.

A block copolymer obtained through block polymerization as described above is preferably subjected to a coupling reaction using a coupling agent. Through this coupling reaction, it is possible to, for example, cause bonding between the ends of diblock structures contained in the block copolymer via the coupling agent to achieve conversion to triblock structures (i.e., reduce the diblock content).

Examples of coupling agents that can be used in the coupling reaction include, but are not specifically limited to, difunctional coupling agents, trifunctional coupling agents, tetrafunctional coupling agents, and coupling agents having a functionality of 5 or higher.

Examples of difunctional coupling agents that may be used include difunctional halosilanes such as dichlorosilane, monomethyldichlorosilane, and dichlorodimethylsilane; difunctional haloalkanes such as dichloroethane, dibromoethane, methylene chloride, and dibromomethane; and difunctional tin halides such as tin dichloride, monomethyltin dichloride, dimethyltin dichloride, monoethyltin dichloride, diethyltin dichloride, monobutyltin dichloride, and dibutyltin dichloride.

Examples of trifunctional coupling agents that may be used include trifunctional haloalkanes such as trichloroethane and trichloropropane; trifunctional halosilanes such as methyltrichlorosilane and ethyltrichlorosilane; and trifunctional alkoxysilanes such as methyltrimethoxysilane, phenyltrimethoxysilane, and phenyltriethoxysilane.

Examples of tetrafunctional coupling agents that may be used include tetrafunctional haloalkanes such as carbon tetrachloride, carbon tetrabromide, and tetrachloroethane; tetrafunctional halosilanes such as tetrachlorosilane and tetrabromosilane; tetrafunctional alkoxysilanes such as tetramethoxysilane and tetraethoxysilane; and tetrafunctional tin halides such as tin tetrachloride and tin tetrabromide.

Examples of coupling agents having a functionality of 5 or higher that may be used include 1,1,1,2,2-pentachloroethane, perchloroethane, pentachlorobenzene, perchlorobenzene, octabromodiphenyl ether, and decabromodiphenyl ether.

One of these coupling agents may be used individually, or two or more of these coupling agents may be used in combination.

Of these coupling agents, dichlorodimethylsilane is preferable from a viewpoint that a block copolymer having a diblock content within a certain range can easily be produced. As a result of the coupling reaction using the coupling agent, a coupling moiety derived from the coupling agent is introduced into a constituent polymer chain (for example, a triblock structure) of the block copolymer.

From a viewpoint of producing the desired particulate polymer A, it is preferable that phase-inversion emulsification is performed using the resultant polymer solution and an aqueous solution, and then the emulsified product is separated.

The phase-inversion emulsification may be carried out using a known emulsifying and dispersing device, for example. Moreover, the separation may be carried out using a known chromatographic column, for example. However, these are not intended to be limitations.

<<Volume-Average Particle Diameter>>

The volume-average particle diameter of the particulate polymer A obtained as set forth above is preferably 0.6 μm or more, more preferably 0.7 μm or more, and even more preferably 0.8 μm or more, and is preferably 2.5 μm or less, more preferably 2.3 μm or less, and even more preferably 2 μm or less. When the volume-average particle diameter of the particulate polymer A is 0.6 μm or more, the particulate polymer A can more favorably follow expansion and contraction of an electrode active material associated with repeated charging and discharging through good adhesion to the electrode active material. This can further inhibit electrode swelling associated with repeated charging and discharging and further improve secondary battery cycle characteristics. On the other hand, when the volume-average particle diameter of the particulate polymer A is 2.5 μm or less, secondary battery cycle characteristics can be further improved.

The particulate polymer A preferably has a larger volume-average particle diameter than the subsequently described particulate polymer B. When the volume-average particle diameter of the particulate polymer A is larger than the volume-average particle diameter of the particulate polymer B, the particulate polymer A can adequately display an expected attribute of favorably following expansion and contraction of an electrode active material associated with repeated charging and discharging. This can further inhibit electrode swelling associated with repeated charging and discharging and further improve secondary battery cycle characteristics.

<Particulate Polymer B>

In an electrode produced by forming an electrode mixed material layer on a current collector using a slurry composition for a non-aqueous secondary battery electrode produced using the binder composition, the particulate polymer B holds components contained in the electrode mixed material layer to prevent these components detaching from the electrode mixed material layer (i.e., functions as a binder in conjunction with the particulate polymer A set forth above).

<<Structure and Chemical Composition>>

The particulate polymer B is a random copolymer that includes an aliphatic conjugated diene monomer unit and an aromatic vinyl monomer unit, and may further include other repeating units. The particulate polymer B in which aliphatic conjugated diene monomer units and aromatic vinyl monomer units are randomly linked has excellent dispersibility in a dispersion medium such as water and can improve stability of a slurry composition containing the binder composition.

[Aliphatic Conjugated Diene Monomer Unit]

Examples of aliphatic conjugated diene monomers that can form an aliphatic conjugated diene monomer unit of the particulate polymer B include, but are not specifically limited to, the same aliphatic conjugated diene monomers as can form an aliphatic conjugated diene monomer unit of the particulate polymer A. Of these aliphatic conjugated diene monomers, 1,3-butadiene is preferable. One of these aliphatic conjugated diene monomers may be used individually, or two or more of these aliphatic conjugated diene monomers may be used in combination.

The proportion constituted by the aliphatic conjugated diene monomer unit in the particulate polymer B when the amount of all repeating units in the particulate polymer B is taken to be 100 mass % is preferably 20 mass % or more, more preferably 25 mass % or more, even more preferably 30 mass % or more, and particularly preferably 33 mass % or more, and is preferably 60 mass % or less, more preferably 58 mass % or less, even more preferably 55 mass % or less, and particularly preferably 50 mass % or less.

When the proportion constituted by the aliphatic conjugated diene monomer unit in the particulate polymer B is 20 mass % or more, the particulate polymer B can more favorably follow expansion and contraction of an electrode active material due to having sufficient flexibility. This can further inhibit electrode swelling associated with repeated charging and discharging and further improve secondary battery cycle characteristics. On the other hand, when the proportion constituted by the aliphatic conjugated diene monomer unit in the particulate polymer B is 60 mass % or less, sufficient stiffness of the particulate polymer B can be ensured and secondary battery cycle characteristics can be further improved.

[Aromatic Vinyl Monomer Unit]

Examples of aromatic vinyl monomers that can form an aromatic vinyl monomer unit of the particulate polymer B include, but are not specifically limited to, the same aromatic vinyl monomers that can form an aromatic vinyl monomer unit of the particulate polymer A. Of these aromatic vinyl monomers, styrene is preferable. One of these aromatic vinyl monomers may be used individually, or two or more of these aromatic vinyl monomers may be used in combination.

The proportion constituted by the aromatic vinyl monomer unit in the particulate polymer B when the amount of all repeating units in the particulate polymer B is taken to be 100 mass % is preferably 10 mass % or more, more preferably 15 mass % or more, even more preferably 20 mass % or more, and particularly preferably 30 mass % or more, and is preferably 70 mass % or less, more preferably 68 mass % or less, and even more preferably 65 mass % or less. When the proportion constituted by the aromatic vinyl monomer unit in the particulate polymer B is within any of the ranges set forth above, dispersibility of the particulate polymer B in a dispersion medium can be ensured and slurry composition stability can be sufficiently increased.

Moreover, when the proportion constituted by the aromatic vinyl monomer unit in the particulate polymer B is 10 mass % or more, sufficient stiffness of the particulate polymer B can be ensured and electrode swelling associated with repeated charging and discharging can be further inhibited while also further improving secondary battery cycle characteristics. On the other hand, when the proportion constituted by the aromatic vinyl monomer unit in the particulate polymer B is 70 mass % or less, sufficient flexibility of the particulate polymer B can be ensured and secondary battery cycle characteristics can be further improved.

[Other Repeating Units]

Although no specific limitations are placed on monomers units other than the aliphatic conjugated diene monomer unit and the aromatic vinyl monomer unit described above that may be included in the particulate polymer B, a hydrophilic group-containing monomer unit is preferable.

Examples of hydrophilic group-containing monomers that can form a hydrophilic group-containing monomer unit in the particulate polymer B include those described in JP 2017-10822 A. Of these hydrophilic group-containing monomers, itaconic acid is more preferable as a carboxy group-containing monomer and 2-hydroxyethyl acrylate is more preferable as a hydroxy group-containing monomer.

<<Production Method>>

No specific limitations are placed on the mode of polymerization of the particulate polymer B. For example, any of solution polymerization, suspension polymerization, bulk polymerization, and emulsion polymerization may be used. Moreover, the polymerization reaction may be addition polymerization such as ionic polymerization, radical polymerization, or living radical polymerization. An emulsifier, dispersant, polymerization initiator, polymerization aid, or the like used in polymerization may be the same as typically used and the amount thereof may also be the same as typically used.

<<Volume-Average Particle Diameter>>

The volume-average particle diameter of the particulate polymer B obtained as set forth above is preferably 0.01 μm or more, more preferably 0.07 μm or more, and even more preferably 0.12 μm or more, and is preferably 0.5 μm or less, more preferably 0.3 μm or less, and even more preferably 0.25 μm or less. When the volume-average particle diameter of the particulate polymer B is 0.01 μm or more, the particulate polymer B can favorably follow expansion and contraction of an electrode active material associated with repeated charging and discharging, together with the particulate polymer A, due to good adhesion of the particulate polymer B to the electrode active material. This can further inhibit electrode swelling associated with repeated charging and discharging and further improve secondary battery cycle characteristics. On the other hand, when the volume-average particle diameter of the particulate polymer B is 0.5 μm or less, secondary battery cycle characteristics can be further improved.

<Content Ratio of Particulate Polymer a and Particulate Polymer B>

No specific limitations are placed on the content ratio (in terms of solid content) of the particulate polymer A and the particulate polymer B in the presently disclosed binder composition. The content of the particulate polymer A in the presently disclosed binder composition, for example, is preferably 20 mass % or more, more preferably 30 mass % or more, and even more preferably 50 mass % or more of the total content of the particulate polymer A and the particulate polymer B, and is preferably 80 mass % or less, more preferably 75 mass % or less, and even more preferably 70 mass % or less of the total content of the particulate polymer A and the particulate polymer B. When the content of the particulate polymer A among the total content of the particulate polymers A and B is 20 mass % or more, electrode swelling associated with repeated charging and discharging can be further inhibited. On the other hand, when the content of the particulate polymer A among the total content of the particulate polymers A and B is 80 mass % or less, slurry composition stability can be further improved. Therefore, an electrode that can further improve secondary battery cycle characteristics can be produced when the content of the particulate polymer A among the total content of the particulate polymers A and B is within any of the ranges set forth above.

It should be noted that the binder composition may further contain a polymer other than the particulate polymer A and the particulate polymer B as a binder.

<Dispersion Medium>

The dispersion medium contained in the presently disclosed binder composition may be water, for example, but is not specifically limited thereto. Also note that the dispersion medium may be an aqueous solution or may be a mixed solution of water and a small amount of an organic solvent.

<Other Components>

Other than the components set forth above, the presently disclosed binder composition may contain components such as a reinforcing material, a leveling agent, a viscosity modifier, and an additive for electrolyte solution. These other components are not specifically limited so long as they do not affect the battery reactions and may be selected from commonly known components such as those described in WO 2012/115096 A1. One of such other components may be used individually, or two or more of such other components may be used in combination in a freely selected ratio.

<Production Method of Binder Composition>

The presently disclosed binder composition can be produced by mixing the particulate polymer A, the particulate polymer B, and optional other components in the presence of the dispersion medium without any specific limitations. Note that in a situation in which a dispersion liquid of a particulate polymer is used in production of the binder composition, liquid content of this dispersion liquid may be used as the dispersion medium of the binder composition.

(Slurry Composition for Non-Aqueous Secondary Battery Electrode)

The presently disclosed slurry composition contains an electrode active material and the presently disclosed binder composition set forth above, and may optionally further contain other components. In other words, the presently disclosed slurry composition normally contains an electrode active material, the above-described particulate polymers A and B, and a dispersion medium, and optionally further contains other components. The presently disclosed slurry composition has excellent stability as a result of containing the binder composition set forth above. Moreover, when the slurry composition containing the binder composition set forth above is used to produce an electrode, swelling of the electrode associated with repeated secondary battery charging and discharging can be inhibited, and a secondary battery can be caused to display excellent battery characteristics (particularly cycle characteristics) by using this electrode.

Although the following describes, as one example, a case in which the slurry composition for a non-aqueous secondary battery electrode is a slurry composition for a lithium ion secondary battery negative electrode, the presently disclosed slurry composition for a non-aqueous secondary battery electrode is not limited to the following example.

<Electrode Active Material>

The electrode active material is a material that gives and receives electrons in an electrode of a secondary battery. In a case in which the secondary battery is a lithium ion secondary battery, for example, the electrode active material is normally a material that can occlude and release lithium.

Although the following describes, as one example, a case in which the slurry composition for a non-aqueous secondary battery electrode is a slurry composition for a lithium ion secondary battery electrode, the presently disclosed slurry composition for a non-aqueous secondary battery electrode is not limited to the following example.

Examples of positive electrode active materials for lithium ion secondary batteries include, but are not specifically limited to, known positive electrode active materials such as lithium-containing cobalt oxide ($LiCoO_2$), lithium manganate ($LiMn_2O_4$), lithium-containing nickel oxide ($LiNiO_2$), a lithium-containing complex oxide of Co—Ni—Mn ($Li(Co\ Mn\ Ni)O_2$), a lithium-containing complex oxide of Ni—Mn—Al, a lithium-containing complex oxide of Ni—Co—Al, olivine-type lithium iron phosphate ($LiFePO_4$), olivine-type manganese lithium phosphate ($LiMnPO_4$), a $Li_2MnO_3$—$LiNiO_2$ based solid solution, a lithium-rich spinel compound represented by $Li_{1+x}Mn_{2-x}O_4$ ($0<x<2$), $Li[Ni_{0.17}Li_{0.2}Co_{0.07}Mn_{0.56}]O_2$, and $LiNi_{0.5}Mn_{1.5}O_4$.

The amount and particle diameter of the positive electrode active material are not specifically limited and may be the same as those of conventionally-used positive electrode active materials.

Examples of negative electrode active materials for lithium ion secondary batteries include carbon-based negative electrode active materials, metal-based negative electrode active materials, and negative electrode active materials that are combinations thereof.

Carbon-based negative electrode active materials can be defined as active materials that contain carbon as their main framework and into which lithium can be inserted (also referred to as "doping"). Examples of carbon-based negative electrode active materials include carbonaceous materials and graphitic materials.

Examples of carbonaceous materials include graphitizing carbon and non-graphitizing carbon, typified by glassy carbon, which has a structure similar to an amorphous structure.

The graphitizing carbon may be a carbon material made using tar pitch obtained from petroleum or coal as a raw material. Specific examples of graphitizing carbon include coke, mesocarbon microbeads (MCMB), mesophase pitch-based carbon fiber, and pyrolytic vapor-grown carbon fiber.

Examples of the non-graphitizing carbon include pyrolyzed phenolic resin, polyacrylonitrile-based carbon fiber, quasi-isotropic carbon, pyrolyzed furfuryl alcohol resin (PFA), and hard carbon.

Examples of graphitic materials include natural graphite and artificial graphite.

Examples of the artificial graphite include artificial graphite obtained by heat-treating carbon containing graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

The metal-based negative electrode active material is an active material that contains metal, the structure of which usually contains an element that allows insertion of lithium, and that exhibits a theoretical electric capacity per unit mass of 500 mAh/g or more when lithium is inserted. Examples of the metal-based active material include lithium metal; a simple substance of metal that can form a lithium alloy (for example, Ag, Al, Ba, Bi, Cu, Ga, Ge, In, Ni, P, Pb, Sb, Si, Sn, Sr, Zn, or Ti); alloys of the simple substance of metal; and oxides, sulfides, nitrides, silicides, carbides, and phosphides of lithium metal, the simple substance of metal, and the alloys of the simple substance of metal. Of these metal-based negative electrode active materials, active materials containing silicon (silicon-based negative electrode active materials) are preferred. One reason for this is that the capacity of a lithium ion secondary battery can be increased though use of a silicon-based negative electrode active material.

Examples of the silicon-based negative electrode active material include silicon (Si), a silicon-containing alloy, SiO, $SiO_x$, and a composite material of conductive carbon and a Si-containing material obtained by coating or combining the Si-containing material with the conductive carbon. One of these silicon-based negative electrode active materials may be used individually, or two or more of these silicon-based negative electrode active materials may be used in combination.

The amount and particle diameter of the negative electrode active material are not specifically limited and may be the same as those of conventionally-used negative electrode active materials.

<Other Components>

Examples of other components that may be contained in the slurry composition include, but are not specifically limited to, the same other components as may be contained in the presently disclosed binder composition. It is preferable that carboxymethyl cellulose is used as a viscosity modifier from a viewpoint of obtaining excellent coatability through thickening.

The slurry composition may further contain a conductive material such as carbon black. One of such other components may be used individually, or two or more of such other components may be used in combination in a freely selected ratio.

<Production Method of Slurry Composition>

The slurry composition set forth above may be produced by dispersing or dissolving the above-described components in a dispersion medium such as water. Specifically, the slurry composition may be produced by mixing the components and the dispersion medium using a mixer such as a ball mill, a sand mill, a bead mill, a pigment disperser, a grinding machine, an ultrasonic disperser, a homogenizer, a planetary mixer, or a FILMIX. Mixing of the aforementioned components and the dispersion medium can normally be performed for a period of 10 minutes to several hours in a temperature range of room temperature to 80° C. The dispersion medium that is used in production of the slurry composition may be the same type of dispersion medium as in the binder composition. Moreover, the dispersion medium used in production of the slurry composition may include the dispersion medium that was contained in the binder composition.

(Electrode for Non-Aqueous Secondary Battery)

The presently disclosed electrode includes an electrode mixed material layer formed using the presently disclosed slurry composition set forth above, and normally includes a current collector having the electrode mixed material layer formed thereon. The electrode mixed material layer contains at least the electrode active material and polymer derived from the particulate polymer A and the particulate polymer B. It should be noted that components contained in the electrode mixed material layer are components that are contained in the previously described slurry composition. Furthermore, the preferred ratio of these components in the electrode mixed material layer is the same as the preferred ratio of these components in the slurry composition.

The presently disclosed electrode has a low tendency to swell in association with repeated charging and discharging of a secondary battery as a result of being formed using a slurry composition that contains the presently disclosed binder composition. Moreover, as a result of the presently disclosed electrode being formed using a slurry composition that contains the presently disclosed binder composition, the electrode can be used to obtain a secondary battery having excellent battery characteristics such as cycle characteristics.

In a case in which the presently disclosed electrode for a non-aqueous secondary battery is a negative electrode for a non-aqueous secondary battery, the density of a negative electrode mixed material layer of the negative electrode is preferably 1.7 g/cm$^3$ or more, and more preferably 1.8 g/cm$^3$ or more. Although no specific limitations are placed on the upper limit for the density of the negative electrode mixed material layer, the density of the negative electrode mixed material layer is normally 2.0 g/cm$^3$ or less.

In a case in which the presently disclosed electrode for a non-aqueous secondary battery is a positive electrode for a non-aqueous secondary battery, the density of a positive electrode mixed material layer of the positive electrode is preferably 3.0 g/cm$^3$ or more, and more preferably 3.5 g/cm$^3$ or more. Although no specific limitations are placed on the upper limit for the density of the positive electrode mixed material layer, the density of the positive electrode mixed material layer is normally 3.8 g/cm$^3$ or less.

When the density of the electrode mixed material layer (positive electrode mixed material layer or negative electrode mixed material layer) is not less than any of the lower limits set forth above, secondary battery energy density can be sufficiently increased. Densification of an electrode mixed material layer may negatively affect battery characteristics because it becomes harder for electrolyte solution to permeate the electrode mixed material layer. However, as a result of the presently disclosed electrode including an electrode mixed material layer formed using a slurry composition that contains the presently disclosed binder composition, excellent battery characteristics (particularly cycle characteristics) of a secondary battery can adequately be ensured even when the electrode mixed material layer is densified and permeation of electrolyte solution becomes difficult.

(Production Method of Electrode for Non-Aqueous Secondary Battery)

The presently disclosed electrode set forth above can be produced by the presently disclosed method of producing an electrode, for example.

The presently disclosed method of producing an electrode includes a step of applying the presently disclosed slurry composition set forth above onto a current collector (application step), a step of drying the slurry composition that has been applied onto the current collector to form a pre-pressing electrode mixed material layer on the current collector (drying step), and a step of pressing the pre-pressing electrode mixed material layer to obtain a post-pressing electrode mixed material layer (pressing step), wherein the pressing of the pre-pressing electrode mixed material layer in the pressing step is performed at a temperature (pressing temperature) of not lower than 50° C. and not higher than 150° C.

<Application Step>

The slurry composition can be applied onto the current collector by any commonly known method without any specific limitations. Specific examples of application methods that can be used include doctor blading, dip coating, reverse roll coating, direct roll coating, gravure coating, extrusion coating, and brush coating. The slurry composition may be applied onto one side or both sides of the current collector. The thickness of the slurry coating on the current collector after application but before drying may be set as appropriate in accordance with the desired electrode mixed material layer thickness.

<Drying Step>

The slurry composition on the current collector may be dried by any commonly known method without any specific limitations. Examples of drying methods that can be used include drying by warm, hot, or low-humidity air; drying in a vacuum; and drying by irradiation with infrared light, electron beams, or the like. By drying the slurry composition on the current collector in this manner, a pre-pressing electrode mixed material layer can be formed on the current collector.

<Pressing Step>

The pre-pressing electrode mixed material layer on the current collector may be pressed by any commonly known method without any specific limitations. Examples of pressing methods that can be used include mold pressing and roll pressing. The pressing temperature is not lower than 50° C. and not higher than 150° C., is preferably 80° C. or higher, and more preferably 100° C. or higher, and is preferably 120° C. or lower. When the pressing temperature is within any of the ranges set forth above, the post-pressing electrode mixed material layer can favorably adhere to the current collector and secondary battery cycle characteristics can be further improved.

Note that a step of heating the electrode may be implemented before the pressing step.

(Non-Aqueous Secondary Battery)

The presently disclosed secondary battery includes the presently disclosed electrode (positive/negative electrode) set forth above. More specifically, the presently disclosed secondary battery includes a positive electrode, a negative electrode, an electrolyte solution, and a separator, wherein the presently disclosed electrode set forth above is used for at least one of the positive electrode and the negative electrode. The presently disclosed secondary battery has excellent battery characteristics such as cycle characteristics as a result of including the presently disclosed electrode.

It is preferable that the presently disclosed secondary battery is a secondary battery in which the presently disclosed electrode is used as a negative electrode. Although the following describes, as one example, a case in which the secondary battery is a lithium ion secondary battery, the presently disclosed secondary battery is not limited to the following example.

<Electrodes>

As explained above, the presently disclosed electrode for a non-aqueous secondary battery is used as at least one of the positive electrode and the negative electrode. In other words, the positive electrode of the lithium ion secondary battery may be the presently disclosed electrode and the negative electrode of the lithium ion secondary battery may be a known negative electrode other than the presently disclosed electrode. Alternatively, the negative electrode of the lithium ion secondary battery may be the presently disclosed electrode and the positive electrode of the lithium ion secondary battery may be a known positive electrode other than the presently disclosed electrode. Further alternatively, the positive electrode and the negative electrode of the lithium ion secondary battery may both be the presently disclosed electrode.

Note that when a known electrode other than the presently disclosed electrode for a non-aqueous secondary battery is used, this electrode may be an electrode that is obtained by forming an electrode mixed material layer on a current collector by a known production method.

<Electrolyte Solution>

The electrolyte solution is normally an organic electrolyte solution obtained by dissolving a supporting electrolyte in an organic solvent. The supporting electrolyte of a lithium ion secondary battery may, for example, be a lithium salt. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable, and $LiPF_6$ is particularly preferable as these lithium salts readily dissolve in solvents and exhibit a high degree of dissociation. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferred for their high dielectric constant and broad stable potential region.

The concentration of the electrolyte in the electrolyte solution may be adjusted as appropriate. For example, the concentration of the electrolyte is preferably 0.5 mass % to 15 mass %, more preferably 2 mass % to 13 mass %, and even more preferably 5 mass % to 10 mass %. Known additives such as vinylene carbonate (VC), fluoroethylene carbonate, and ethyl methyl sulfone may be added to the electrolyte solution.

<Separator>

Examples of separators that can be used include, but are not specifically limited to, those described in JP 2012-204303 A. Of these separators, a microporous membrane made of polyolefinic (polyethylene, polypropylene, polybutene, or polyvinyl chloride) resin is preferred because such a membrane can reduce the total thickness of the separator, which increases the ratio of electrode active material in the secondary battery, and consequently increases the capacity per volume.

<Production of Non-Aqueous Secondary Battery>

The presently disclosed non-aqueous secondary battery may be produced, for example, by stacking the positive electrode and the negative electrode with the separator in-between, performing rolling, folding, or the like of the resultant laminate as necessary in accordance with the battery shape, placing the laminate in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion constituted by a monomer unit in the polymer that is formed through polymerization of a given monomer is normally, unless otherwise specified, the same as the ratio (charging ratio) of the given monomer among all monomers used in polymerization of the polymer.

In the examples and comparative examples, the following methods were used to evaluate the volume-average particle diameters of a particulate polymer A and a particulate polymer B, the diblock content of a particulate polymer A, the content ratio of a particulate polymer A and a particulate polymer B in a binder composition, the stability of a slurry composition, the inhibition of negative electrode swelling, and the cycle characteristics of a secondary battery.

<Volume-Average Particle Diameter>

The volume-average particle diameter (D50) of each particulate polymer A and particulate polymer B produced in the examples and comparative examples was measured using a laser diffraction particle diameter distribution analyzer (produced by Beckman Coulter, Inc.; product name: LS-230). Specifically, a water dispersion of the particulate polymer A or B that had been adjusted to a solid content concentration of 0.1 mass % was measured using the aforementioned analyzer to obtain a particle size distribution (volume basis), and then a particle diameter (μm) in the particle size distribution at which cumulative volume calculated from the small diameter end of the distribution reached 50% was taken to be the volume-average particle diameter.

<Diblock Content>

The percentage content of copolymer having a diblock structure (diblock content) in a particulate polymer A was measured as a molecular weight in terms of polystyrene using a high-performance liquid chromatograph (apparatus: HLC8220 (model no.) produced by Tosoh Corporation). In this measurement, three connected columns (Shodex KF-404HQ (model no.) produced by Showa Denko K.K.; column temperature: 40° C.; carrier: tetrahydrofuran at flow rate of 0.35 mL/minute) were used and a differential refractometer and a UV detector were used as detectors. Calibration of molecular weight was performed with 12 points for standard polystyrene (produced by Polymer Laboratories Ltd.; standard molecular weight: 500 to 3,000,000). The diblock content (mass %) was determined from the area ratio of peaks corresponding to each block copolymer in a chart obtained by high-performance liquid chromatography.

<Content Ratio>

The content ratio, in a binder composition, of a particulate polymer A having an aromatic vinyl block region and a particulate polymer B that was a random copolymer was measured using an atomic force microscope (unit: SPA400; probe station: SPI3800N; cantilever: SI-DF40; measurement mode: SIS-DFM). Specifically, a film obtained through drying of the binder composition was first cut and then the cut surface was observed under the atomic force microscope. Next, a square region having a side length of 3 μm was arbitrarily selected in the observed cut surface, and then a content ratio (mass basis) of the particulate polymer A and the particulate polymer B was calculated from areas obtained by surface mapping through differences in viscoelasticity in this square region. The results are shown in Table 1.

<Stability of Slurry Composition>

The stability of a slurry composition was evaluated based on the change in viscosity between before and after addition of a binder composition in production of the slurry composition.

Specifically, a mixture was first obtained by adding 100 parts of artificial graphite (capacity: 360 mAh/g) as a negative electrode active material, 1 part of carbon black (produced by TIMCAL Ltd.; product name: Super C65) as a Conductive Material, and 1.2 Parts in Terms of Solid Content of a 2% aqueous solution of carboxymethyl cellulose (produced by Nippon Paper Industries Co., Ltd.; product name: MAC-350HC) as a thickener into a planetary mixer equipped with a disper blade. The resultant mixture was adjusted to a solid content concentration of 60% with deionized water and was subsequently mixed for 60 minutes at 25° C. Next, the mixture was adjusted to a solid content concentration of 52% with deionized water and was then further mixed for 15 minutes at 25° C. to yield a mixed liquid. The viscosity M0 (mPa·s) of the mixed liquid was measured using a B-type viscometer (produced by Toki Sangyo Co., Ltd.; product name: TV-25) under conditions of a measurement temperature of 25° C., a No. 4 measurement rotor, and a rotor rotation speed of 60 rpm.

Next, 2.2 parts in terms of solid content of the binder composition was added to the mixed liquid. Straight after addition of the binder composition, the mixed liquid was loaded into a cylindrical vessel having a diameter of 5.5 cm and a height of 8.0 cm and was stirred for 10 minutes at a rotation speed of 3,000 rpm using a TK Homogenizing Disper (produced by PRIMIX Corporation; disper blade diameter: 40 mm). The viscosity M1 (mP·s) of the mixed liquid after stirring was measured in the same way as the viscosity M0. A viscosity change rate ΔM (=M1/M0) between before and after addition of the binder composition was calculated from the obtained viscosities M0 and M1 and was evaluated by the following standard. A smaller value for ΔM indicates a smaller degree of thickening through addition of the binder composition and higher slurry composition stability.
  A: Viscosity change rate ΔM of 1.0 times or less
  B: Viscosity change rate ΔM of more than 1.0 times and less than 1.2 times
  C: Viscosity change rate ΔM of 1.2 times or more
<Inhibition of Negative Electrode Swelling>

A produced lithium ion secondary battery was left at rest for 24 hours in a 25° C. environment and was then subjected to a charge/discharge operation of 1 C charging to 4.35 V and 1 C discharging to 3.0 V in a 25° C. environment. Next, the lithium ion secondary battery was subjected to 50 cycles of a charge/discharge operation of 1 C charging to 4.35 V and 1 C discharging to 3.0 V in a 45° C. environment. Thereafter, the lithium ion secondary battery was 1 C charged in a 25° C. environment and the cell was disassembled in a charged state to remove the negative electrode. The thickness d1 of the negative electrode mixed material layer was measured. The thickness of the negative electrode mixed material layer prior to production of the lithium ion secondary battery was taken to be d0. A thickness change rate indicated by $\Delta d=\{(d1-d0)/d0\}\times 100(\%)$ was calculated and was evaluated by the following standard. A smaller thickness change rate Δd indicates less swelling of the negative electrode after cycling.
  A: Thickness change rate Δd of less than 25%
  B: Thickness change rate Δd of not less than 25% and less than 30%
  C: Thickness change rate Δd of not less than 30% and less than 35%
  D: Thickness change rate Δd of 35% or more
<Cycle Characteristics of Secondary Battery>

A produced lithium ion secondary battery was left at rest for 24 hours in a 25° C. environment and was then subjected to a charge/discharge operation of 1 C charging to 4.35 V and 1 C discharging to 3.0 V in a 25° C. environment. The initial capacity C0 was measured. Next, the lithium ion secondary battery was subjected to 300 cycles of a charge/discharge operation of 1 C charging to 4.35 V and 1 C discharging to 3.0 V in a 45° C. environment. The capacity C1 after 300 cycles was measured. A capacity maintenance rate $\Delta C(=(C1/C0)\times 100(\%))$ was calculated from the initial capacity C0 and the capacity after 300 cycles and was evaluated by the following standard. A higher value for the capacity maintenance rate ΔC indicates a smaller decrease in discharge capacity and better cycle characteristics.
  A: Capacity maintenance rate ΔC of 80% or more
  B: Capacity maintenance rate ΔC of not less than 75% and less than 80%
  C: Capacity maintenance rate of not less than 70% and less than 75%
  D: Capacity maintenance rate ΔC of less than 70%

Example 1

<Production of Particulate Polymer A>

A pressure-resistant reactor was charged with 233.3 kg of cyclohexane, 60.0 mmol of N,N,N',N'-tetramethylethylenediamine, and 14.0 kg of styrene as an aromatic vinyl monomer. These materials were stirred at 40° C. while 2000.0 mmol of n-butyllithium was added as a polymerization initiator and were then polymerized for 1 hour while raising the temperature to 50° C. The polymerization conversion rate of styrene was 100%. Next, 86.0 kg of 1,3-butadiene was continuously added to the pressure-resistant reactor over 1 hour as an aliphatic conjugated diene monomer while performing temperature control to maintain a temperature of 50° C. to 60° C. The polymerization reaction was continued for 1 hour more after addition of the 1,3-butadiene was complete. The polymerization conversion rate of 1,3-butadiene was 100%.

Next, 820.0 mmol of dichlorodimethylsilane was added to the pressure-resistant reactor as a coupling agent and a coupling reaction was carried out for 2 hours to form a styrene-butadiene block copolymer. Thereafter, 4000.0 mmol of methanol was added to the reaction liquid in which styrene-butadiene block copolymer having active ends was thought to remain and was mixed therewith to deactivate the active ends. Next, 0.3 parts of 2,6-di-tert-butyl-p-cresol was added as an antioxidant to 100 parts of the reaction liquid (containing 30.0 parts of polymer component) obtained as described above and was mixed therewith to obtain a styrene-butadiene-styrene triblock copolymer solution comprising 14% of regions composed of styrene units (styrene regions) and 86% of regions composed of 1,3-butadiene units (1,3-butadiene regions). The weight-average molecular weight Mw of the obtained block copolymer was 140,000.

Next, sodium linear alkylbenzene sulfonate was dissolved in deionized water to prepare an aqueous solution having a total solid content of 2 mass %.

A tank was charged with 500 g of the obtained copolymer solution and 500 g of the obtained aqueous solution and was stirred to perform premixing and obtain a preliminary mixture. Next, a metering pump was used to transfer the preliminary mixture from the tank to a continuous high-performance emulsifying and dispersing device (produced by Pacific Machinery & Engineering Co., Ltd.; product name: Milder MDN303V) at a rate of 100 g/minute, and the preliminary mixture was stirred at a rotation speed of 20,000 rpm to cause phase-inversion emulsification of the preliminary mixture and obtain an emulsion.

Toluene in the obtained emulsion was subsequently evaporated under reduced pressure in a rotary evaporator. The emulsion resulting from this evaporation was left to separate for 1 day in a chromatographic column equipped with a stop-cock, and a lower layer portion was removed after separation to perform concentration.

Finally, an upper layer portion was filtered through a 100-mesh screen to obtain a block copolymer latex (water dispersion containing particulate polymer A; solid content concentration: 40%) comprising styrene regions and 1,3-butadiene regions.

The volume-average particle diameter of the obtained particulate polymer A was measured. The result is shown in Table 1. The diblock content of the obtained particulate polymer A was 15 mass %.

<Production of Particulate Polymer B>

A mixture of 33 parts of 1,3-butadiene as an aliphatic conjugated diene monomer, 62 parts of styrene as an aromatic vinyl monomer, 4 parts of itaconic acid as a carboxy group-containing monomer, 0.3 parts of tert-dodecyl mercaptan as a chain transfer agent, and 0.3 parts of sodium lauryl sulfate as an emulsifier that had been charged to a vessel A was added into a pressure-resistant vessel B, and, simultaneously to the start of this addition, addition of 1 part of potassium persulfate to the pressure-resistant vessel B as a polymerization initiator was started to initiate polymerization. The reaction temperature was maintained at 75° C.

Once 4 hours had passed from the start of polymerization (after addition of 70% of the mixture to the pressure-resistant vessel B), 1 part of 2-hydroxyethyl acrylate was added to the pressure-resistant vessel B over 1 hour and 30 minutes as a hydroxy group-containing monomer.

Addition of the total amount of the above-described monomers was completed 5 hours and 30 minutes after the start of polymerization. Heating was subsequently performed to 85° C. and a reaction was carried out for 6 hours.

The reaction was terminated by cooling at the point at which the polymerization conversion rate reached 97% to yield a mixture containing a particulate polymer. The mixture containing the particulate polymer was adjusted to pH 8 through addition of 5% sodium hydroxide aqueous solution. Unreacted monomers were subsequently removed by thermal-vacuum distillation. Cooling was then performed to yield a water dispersion (solid content concentration: 40%) containing a particulate polymer B.

The volume-average particle diameter of the obtained particulate polymer B was measured. The result is shown in Table 1.

<Production of Binder Composition for Non-Aqueous Secondary Battery Electrode>

A mixture was obtained by charging the water dispersions containing the particulate polymer A and the particulate polymer B that were obtained as described above to a vessel such that the content ratio of the particulate polymer A and the particulate polymer B (A:B) was 70:30. The obtained mixture was stirred for 1 hour using a stirrer (produced by SHINTO Scientific Co., Ltd.; product name: Three-One Motor) to obtain a binder composition for a non-aqueous secondary battery electrode. The content ratio of the particulate polymer A and the particulate polymer B in the binder composition as measured by the previously described method was the same as the charging ratio thereof (i.e., 70:30). This result is shown in Table 1. The obtained binder composition was also used to evaluate slurry composition stability. The result is shown in Table 1.

<Production of Slurry Composition for Non-Aqueous Secondary Battery Negative Electrode>

A mixture was obtained by adding 100 parts of artificial graphite (capacity: 360 mAh/g) as a negative electrode active material, 1 part of carbon black (produced by TIMCAL Ltd.; product name: Super C65) as a conductive material, and 1.2 parts in terms of solid content of a 2% aqueous solution of carboxymethyl cellulose (produced by Nippon Paper Industries Co., Ltd.; product name: MAC-350HC) as a thickener into a planetary mixer equipped with a disper blade. The resultant mixture was adjusted to a solid content concentration of 60% with deionized water and was subsequently mixed for 60 minutes at 25° C. Next, the mixture was adjusted to a solid content concentration of 52% with deionized water and was then further mixed for 15 minutes at 25° C. to yield a mixed liquid. Deionized water and 2.2 parts in terms of solid content of the binder composition produced as described above were added to the obtained mixed liquid such that the final solid content concentration was adjusted to 48%. Further mixing was performed for 10 minutes and then a defoaming process was carried out under reduced pressure to yield a slurry composition for a non-aqueous secondary battery negative electrode having good fluidity.

<Formation of Negative Electrode>

The obtained slurry composition for a non-aqueous secondary battery negative electrode was applied onto copper foil (current collector) of 20 μm in thickness using a comma coater such as to have a thickness of approximately 150 μm after drying. The applied slurry composition was dried by conveying the copper foil inside a 60° C. oven for 2 minutes at a speed of 0.5 m/minute. Thereafter, heat treatment was performed for 2 minutes at 120° C. to obtain a pre-pressing negative electrode web. The pre-pressing negative electrode web was rolled by roll pressing (pressing temperature: 105° C.) to obtain a post-pressing negative electrode having a negative electrode mixed material layer thickness of 80 μm.

<Formation of Positive Electrode>

A slurry composition for a non-aqueous secondary battery positive electrode was obtained by mixing 100 parts of $LiCoO_2$ having a volume-average particle diameter of 12 μm as a positive electrode active material, 2 parts of acetylene black (produced by Denka Company Limited; product name: HS-100) as a conductive material, 2 parts in terms of solid content of polyvinylidene fluoride (produced by Kureha Corporation; product name: #7208) as a binder, and N-methylpyrrolidone as a solvent such that the total solid content concentration was 70% and performing mixing of these materials using a planetary mixer.

The obtained slurry composition for a non-aqueous secondary battery positive electrode was applied onto aluminum foil (current collector) of 20 μm in thickness using a comma coater such as to have a thickness of approximately 150 μm after drying. The applied slurry composition was dried by conveying the aluminum foil inside a 60° C. oven for 2 minutes at a speed of 0.5 m/minute. Thereafter, heat treatment was performed for 2 minutes at 120° C. to obtain a positive electrode web.

The resultant positive electrode web was rolled by a roll press to obtain a positive electrode including a positive electrode mixed material layer.

<Preparation of Separator>

A single-layer polypropylene separator (produced by Celgard, LLC.; product name: Celgard 2500) was used as a separator.

<Production of Non-Aqueous Secondary Battery>

The post-pressing positive electrode that was obtained was cut out as a 49 cm×5 cm rectangle and was placed with the surface at the positive electrode mixed material layer side of the positive electrode on top. A separator that had been cut out to 120 cm×5.5 cm was placed on the positive electrode mixed material layer such that the positive electrode was positioned at the longitudinal direction left-hand side of the separator. The post-pressing negative electrode that was obtained was cut out as a 50 cm×5.2 cm rectangle and was placed on the separator such that the surface at the negative electrode mixed material layer side of the negative electrode faced the separator and such that the negative electrode was positioned at the longitudinal direction right-hand side of the separator. The resultant laminate was wound by a winding machine to obtain a roll. This roll was enclosed in an aluminum packing case serving as a battery case. An electrolyte solution (solvent: ethylene carbonate/diethyl carbonate/vinylene carbonate=68.5/30/1.5 (volume ratio); electrolyte: $LiPF_6$ of 1 M in concentration) was injected into the aluminum packing case such that no air remained and then an opening of the aluminum packing case was closed by heat sealing at 150° C. to produce a wound lithium ion secondary battery having a capacity of 800 mAh.

The obtained lithium ion secondary battery was used to evaluate inhibition of negative electrode swelling and cycle characteristics. The results are shown in Table 1.

Examples 2, 3, 6, and 7

A particulate polymer A, a particulate polymer B, a binder composition for a non-aqueous secondary battery electrode, a slurry composition for a non-aqueous secondary battery electrode, an electrode for a non-aqueous secondary battery, and a non-aqueous secondary battery were produced in the same way as in Example 1 with the exception that the content ratio of the particulate polymer A and the particulate polymer B (A:B) was changed to 30:70, 80:20, 10:90, or 90:10 in production of the binder composition for a non-aqueous secondary battery electrode. Evaluations were conducted in the same manner as in Example 1. The results are shown in Table 1.

Examples 4, 8, and 9

A particulate polymer A, a particulate polymer B, a binder composition for a non-aqueous secondary battery electrode, a slurry composition for a non-aqueous secondary battery electrode, an electrode for a non-aqueous secondary battery, and a non-aqueous secondary battery were produced in the same way as in Example 1 with the exception that the chemical composition of monomers in production of the particulate polymer A was changed as shown in Table 1. Evaluations were conducted in the same manner as in Example 1. The results are shown in Table 1. The diblock content of the obtained particulate polymer A was 15 mass % in each of these examples.

Examples 5, 10, and 11

A particulate polymer A, a particulate polymer B, a binder composition for a non-aqueous secondary battery electrode, a slurry composition for a non-aqueous secondary battery electrode, an electrode for a non-aqueous secondary battery, and a non-aqueous secondary battery were produced in the same way as in Example 1 with the exception that the chemical composition of monomers in production of the particulate polymer B was changed as shown in Table 1. Evaluations were conducted in the same manner as in Example 1. The results are shown in Table 1.

Example 12

A particulate polymer B, a binder composition for a non-aqueous secondary battery electrode, a slurry composition for a non-aqueous secondary battery electrode, an electrode for a non-aqueous secondary battery, and a non-aqueous secondary battery were produced in the same way as in Example 1 with the exception that a particulate polymer A produced as described below was used. Evaluations were conducted in the same manner as in Example 1. The results are shown in Table 1.
<Production of Particulate Polymer A>
A styrene-butadiene-styrene triblock copolymer obtained in the same way as in Example 1 was subjected to hydrogenation using a Ti-based hydrogenation catalyst and was subsequently subjected to phase-inversion emulsification, evaporation under reduced pressure, concentration, and filtration operations in the same way as in Example 1 to obtain a water dispersion of a particulate polymer A. The hydrogenation rate of the obtained particulate polymer A as measured using a nuclear magnetic resonance spectrometer was 98 mol %.

Comparative Example 1

A particulate polymer A, a binder composition for a non-aqueous secondary battery electrode, a slurry composition for a non-aqueous secondary battery electrode, an electrode for a non-aqueous secondary battery, and a non-aqueous secondary battery were produced in the same way as in Example 1 with the exception that a particulate polymer B was not produced and only the particulate polymer A was used in production of the binder composition for a non-aqueous secondary battery electrode (i.e., A:B=100:0). Evaluations were conducted in the same manner as in Example 1. The results are shown in Table 1.

Comparative Example 2

A particulate polymer B, a binder composition for a non-aqueous secondary battery electrode, a slurry composition for a non-aqueous secondary battery electrode, an electrode for a non-aqueous secondary battery, and a non-aqueous secondary battery were produced in the same way as in Example 1 with the exception that a particulate polymer A was not produced and only the particulate polymer B was used in production of the binder composition for a non-aqueous secondary battery electrode (i.e., A:B=0:100). Evaluations were conducted in the same manner as in Example 1. The results are shown in Table 1.

Comparative Example 3

A particulate polymer B, a binder composition for a non-aqueous secondary battery electrode, a slurry composition for a non-aqueous secondary battery electrode, an electrode for a non-aqueous secondary battery, and a non-aqueous secondary battery were produced in the same way as in Example 1 with the exception that a random copolymer produced as described below was used instead of a particulate polymer A. Evaluations were conducted in the same manner as in Example 1. The results are shown in Table 1.
<Production of Random Copolymer>
A random copolymer comprising styrene units and 1,3-butadiene units was produced by adding a cyclohexane solution containing 14 parts of styrene as an aromatic vinyl monomer, a cyclohexane solution containing 86 parts of 1,3-butadiene as an aliphatic conjugated diene monomer, 0.1 parts of n-butyllithium as a polymerization initiator, and 0.2 parts of tetramethylethylenediamine into a 50 MPa pressure-resistant autoclave equipped with a stirrer under a nitrogen gas atmosphere and carrying out polymerization for 1 hour at 60° C.

The random copolymer was dissolved in toluene to obtain a polymer solution containing 25 mass % of block copolymer.

Next, sodium linear alkylbenzene sulfonate (soft-type sodium dodecylbenzenesulfonate, LAS) was dissolved in deionized water to prepare an aqueous solution having a total solid content of 2 mass %.

A tank was charged with 500 g of the obtained polymer solution and 500 g of the obtained aqueous solution and was stirred to perform premixing. Next, a metering pump was used to transfer the preliminary mixture from the tank to a continuous high-performance emulsifying and dispersing device (produced by Pacific Machinery & Engineering Co., Ltd.; product name: Milder MDN303V) at a rate of 100 g/minute, and the preliminary mixture was stirred at a rotation speed of 20,000 rpm to cause phase-inversion emulsification of the preliminary mixture and obtain an emulsion.

Toluene in the obtained emulsion was subsequently evaporated under reduced pressure in a rotary evaporator. The emulsion resulting from this evaporation was left to separate for 1 day in a chromatographic column equipped with a stop-cock, and a lower layer portion was removed after separation to perform concentration.

The upper layer portion was finally filtered through a 100-mesh screen to obtain a random copolymer latex (solid content concentration: 60%; particulate polymer) comprising styrene units and 1,3-butadiene units.

In Table 1, shown below:

"SBS" indicates block copolymer comprising styrene regions and 1,3-butadiene regions;

"SEBS" indicates hydrogenated product of block copolymer comprising styrene regions and 1,3-butadiene regions;

"SBR" indicates random copolymer comprising styrene units and 1,3-butadiene units;

"BD" indicates 1,3-butadiene unit or hydrogenated 1,3-butadiene unit;

"ST" indicates styrene unit;

"IA" indicates itaconic acid unit; and

"2-HEA" indicates 2-hydroxyethyl acrylate unit.

TABLE 1

| | | | Example 1 | Example 2 | Example 3 | Example 4 | Example 5 | Example 6 | Example 7 | Example 8 |
|---|---|---|---|---|---|---|---|---|---|---|
| Binder composition | Particulate polymer A | Type | SBS | SBS | SBS | SBS | SBS | SBS | SBS | SBS |
| | | Presence of aromatic vinyl block region | Yes | Yes | Yes | Yes | Yes | Yes | Yes | Yes |
| | | Aliphatic conjugated diene monomer unit + Alkylene structural unit | Type | BD | BD | BD | BD | BD | BD | BD | BD |
| | | | Percentage content [mass %] | 86 | 86 | 86 | 50 | 86 | 86 | 86 | 95 |
| | | Aromatic vinyl monomer unit | Type | ST | ST | ST | ST | ST | ST | ST | ST |
| | | | Percentage content [mass %] | 14 | 14 | 14 | 50 | 14 | 14 | 14 | 5 |
| | | Volume-average particle diameter [μm] | | 0.9 | 0.9 | 0.9 | 0.9 | 0.9 | 0.9 | 0.9 | 0.9 |
| | Particulate polymer B | Type | SBR | SBR | SBR | SBR | SBR | SBR | SBR | SBR |
| | | Aliphatic conjugated diene monomer unit | Type | BD | BD | BD | BD | BD | BD | BD | BD |
| | | | Percentage content [mass %] | 33 | 33 | 33 | 33 | 58 | 33 | 33 | 33 |
| | | Aromatic vinyl monomer unit | Type | ST | ST | ST | ST | ST | ST | ST | ST |
| | | | Percentage content [mass %] | 62 | 62 | 62 | 62 | 37 | 62 | 62 | 62 |
| | | Other monomer units | Type | IA | IA | IA | IA | IA | IA | IA | IA |
| | | | Percentage content [mass %] | 4 | 4 | 4 | 4 | 4 | 4 | 4 | 4 |
| | | | Type | 2-HEA | 2-HEA | 2-BEA | 2-BEA | 2-BEA | 2-HEA | 2-HEA | 2-HEA |
| | | | Percentage content [mass %] | 1 | 1 | 1 | 1 | 1 | 1 | 1 | 1 |
| | | Volume-average particle diameter [μm] | | 0.15 | 0.15 | 0.15 | 0.15 | 0.15 | 0.15 | 0.15 | 0.15 |
| | Content ratio of particulate polymers A and B [A:B] | | 70:30 | 30:70 | 80:20 | 70:30 | 70:30 | 10:90 | 90:10 | 70:30 |
| | Negative electrode mixed material layer density [g/cm³] | | 1.8 | 1.8 | 1.8 | 1.8 | 1.8 | 1.8 | 1.8 | 1.8 |
| Evaluations | Inhibition of swelling | | A | B | A | B | B | C | B | C |
| | Stability | | A | A | B | A | A | A | B | A |
| | Cycle characteristics | | A | A | B | B | B | B | C | B |

TABLE 1-continued

| | | | Example 9 | Example 10 | Example 11 | Example 12 | Comparative Example 1 | Comparative Example 2 | Comparative Example 3 |
|---|---|---|---|---|---|---|---|---|---|
| Binder composition | Particulate polymer A | Type | SBS | SBS | SBS | SEBS | SBS | — | SBR |
| | | Presence of aromatic vinyl block region | Yes | Yes | Yes | Yes | Yes | — | No |
| | | Aliphatic conjugated diene monomer unit + Alkylene structural unit | Type | BD | BD | BD | BD | BD | — | BD |
| | | | Percentage content [mass %] | 40 | 86 | 86 | 86 | 86 | — | 86 |
| | | Aromatic vinyl monomer unit | Type | ST | ST | ST | ST | ST | — | ST |
| | | | Percentage content [mass %] | 60 | 14 | 14 | 14 | 14 | — | 14 |
| | | Volume-average particle diameter [μm] | | 0.9 | 0.9 | 0.9 | 0.9 | 0.9 | — | 0.9 |
| | Particulate polymer B | Type | SBR | SBR | SBR | SBR | — | SBR | SBR |
| | | Aliphatic conjugated diene monomer unit | Type | BD | BD | BD | BD | — | BD | BD |
| | | | Percentage content [mass %] | 33 | 10 | 65 | 33 | — | 33 | 33 |
| | | Aromatic vinyl monomer unit | Type | ST | ST | ST | ST | — | ST | ST |
| | | | Percentage content [mass %] | 62 | 85 | 30 | 62 | — | 62 | 62 |
| | | Other monomer units | Type | IA | IA | IA | IA | — | IA | IA |
| | | | Percentage content [mass %] | 4 | 4 | 4 | 4 | — | 4 | 4 |
| | | | Type | 2-BEA | 2-BEA | 2-HEA | 2-HEA | — | 2-HEA | 2-BEA |
| | | | Percentage content [mass %] | 1 | 1 | 1 | 1 | — | 1 | 1 |
| | | Volume-average particle diameter [μm] | | 0.15 | 0.15 | 0.15 | 0.15 | — | 0.15 | 0.15 |
| | Content ratio of particulate polymers A and B [A:B] | | 70:30 | 70:30 | 70:30 | 70:30 | 100:0 | 0:100 | 70:30 |
| Negative electrode mixed material layer density [g/cm³] | | | 1.8 | 1.8 | 1.8 | 1.8 | 1.8 | 1.8 | 1.8 |
| Evaluations | Inhibition of swelling | | B | C | B | A | D | D | D |
| | Stability | | A | A | A | A | C | A | B |
| | Cycle characteristics | | C | B | C | A | D | D | D |

It can be seen from Table 1 that in Examples 1 to 12 in which a binder composition containing a particulate polymer A and a particulate polymer B was used, slurry composition stability could be ensured while also inhibiting negative electrode swelling associated with repeated charging and discharging and causing a secondary battery to display excellent cycle characteristics.

It can also be seen from Table 1 that in Comparative Example 1 in which a binder composition that contained a particulate polymer A but did not contain a particulate polymer B was used, slurry composition stability could not be ensured, negative electrode swelling associated with repeated charging and discharging could not be inhibited, and secondary battery cycle characteristics deteriorated.

Moreover, it can be seen from Table 1 that in Comparative Example 2 in which a binder composition that contained a particulate polymer B but did not contain a particulate polymer A was used, negative electrode swelling associated with repeated charging and discharging could not be inhibited and secondary battery cycle characteristics deteriorated.

Furthermore, it can be seen from Table 1 that in Comparative Example 3 in which a particulate polymer B was included but a particulate polymer that was a random copolymer was used instead of the particulate polymer A, negative electrode swelling associated with repeated charging and discharging could not be inhibited and secondary battery cycle characteristics deteriorated.

INDUSTRIAL APPLICABILITY

According to the present disclosure, it is possible to provide a binder composition for a non-aqueous secondary battery electrode that can ensure excellent stability of a slurry composition for a non-aqueous secondary battery electrode while also inhibiting swelling of an electrode for a non-aqueous secondary battery associated with repeated charging and discharging and causing a non-aqueous secondary battery to display excellent cycle characteristics.

Moreover, according to the present disclosure, it is possible to provide a slurry composition for a non-aqueous secondary battery electrode that has excellent stability and that can also inhibit swelling of an electrode for a non-aqueous secondary battery associated with repeated charging and discharging and cause a non-aqueous secondary battery to display excellent cycle characteristics.

Furthermore, according to the present disclosure, it is possible to provide an electrode for a non-aqueous secondary battery that has a low tendency to swell in association with repeated charging and discharging and that can cause a non-aqueous secondary battery to display excellent cycle characteristics, and a method of producing this electrode.

Also, according to the present disclosure, it is possible to provide a non-aqueous secondary battery having excellent cycle characteristics.

The invention claimed is:

1. A binder composition for a non-aqueous secondary battery electrode comprising a particulate polymer A and a particulate polymer B, wherein
the particulate polymer A is a copolymer having a block region composed of an aromatic vinyl monomer unit,
the particulate polymer B is a random copolymer including an aliphatic conjugated diene monomer unit and an aromatic vinyl monomer unit,
the copolymer constituting the particulate polymer A comprises a copolymer having a diblock structure including one each of two types of block regions,
a proportion of the copolymer having the diblock structure in the whole particulate polymer A when the mass of the particulate polymer A is taken to be 100 mass % is 10 mass % or more and 85 mass % or less,
the proportion constituted by the block region composed of the aromatic vinyl monomer unit in the particulate polymer A when the amount of all repeating units in the particulate polymer A is taken to be 100 mass % is 10 mass % or more and 45 mass % or less, and
content of the particulate polymer A is not less than 20 mass % and not more than 80 mass % of total content of the particulate polymer A and the particulate polymer B.

2. The binder composition for a non-aqueous secondary battery electrode according to claim 1, wherein
the particulate polymer A further includes either or both of an aliphatic conjugated diene monomer unit and an alkylene structural unit, and
the aliphatic conjugated diene monomer unit and the alkylene structural unit constitute a total proportion of not less than 30 mass % and not more than 90 mass % in the particulate polymer A.

3. The binder composition for a non-aqueous secondary battery electrode according to claim 1, wherein the particulate polymer B includes the aliphatic conjugated diene monomer unit in a proportion of not less than 20 mass % and not more than 60 mass %.

4. The binder composition for a non-aqueous secondary battery electrode according to claim 1, wherein the particulate polymer B includes the aromatic vinyl monomer unit in a proportion of not less than 10 mass % and not more than 70 mass %.

5. The binder composition for a non-aqueous secondary battery electrode according to claim 1, wherein the particulate polymer A has a larger volume-average particle diameter than the particulate polymer B.

6. A slurry composition for a non-aqueous secondary battery electrode comprising:
an electrode active material; and
the binder composition for a non-aqueous secondary battery electrode according to claim 1.

7. An electrode for a non-aqueous secondary battery comprising an electrode mixed material layer formed using the slurry composition for a non-aqueous secondary battery electrode according to claim 6.

8. A negative electrode for a non-aqueous secondary battery comprising a negative electrode mixed material layer formed using the slurry composition for a non-aqueous secondary battery electrode according to claim 6, wherein
the negative electrode mixed material layer has a density of 1.7 g/cm$^3$ or more.

9. A non-aqueous secondary battery comprising the electrode for a non-aqueous secondary battery according to claim 7.

10. A method of producing an electrode for a non-aqueous secondary battery comprising:
applying the slurry composition for a non-aqueous secondary battery electrode according to claim 6 onto a current collector;
drying the slurry composition for a non-aqueous secondary battery electrode that has been applied onto the current collector to form a pre-pressing electrode mixed material layer on the current collector; and
pressing the pre-pressing electrode mixed material layer to obtain a post-pressing electrode mixed material layer, wherein the pressing of the pre-pressing electrode mixed material layer is performed at a temperature of not lower than 50° C. and not higher than 150° C.

11. A non-aqueous secondary battery comprising the negative electrode for a non-aqueous secondary battery according to claim 8.

12. The binder composition for a non-aqueous secondary battery electrode according to claim 1, wherein the block region composed of the aromatic vinyl monomer unit is a molecular chain section where only aromatic vinyl monomer units are linked.

13. The binder composition for a non-aqueous secondary battery electrode according to claim 1, wherein the diblock structure includes an aromatic vinyl block region composed of styrene units and another region composed of 1,3-butadiene units.

* * * * *